(12) United States Patent
Köse

(10) Patent No.: US 11,317,427 B2
(45) Date of Patent: Apr. 26, 2022

(54) NETWORK-ENABLED CONNECTIVITY FOR DISADVANTAGED COMMUNICATION LINKS

(71) Applicant: TrellisWare Technologies, Inc., San Diego, CA (US)

(72) Inventor: Cenk Köse, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 62 days.

(21) Appl. No.: 16/680,157

(22) Filed: Nov. 11, 2019

(65) Prior Publication Data

US 2021/0144732 A1    May 13, 2021

(51) Int. Cl.
| | |
|---|---|
| *H04W 72/12* | (2009.01) |
| *H04W 72/04* | (2009.01) |
| *H04W 76/10* | (2018.01) |
| *H04W 72/08* | (2009.01) |
| *H04L 27/26* | (2006.01) |
| *H04L 27/00* | (2006.01) |

(Continued)

(52) U.S. Cl.
CPC ...... *H04W 72/1231* (2013.01); *H04B 17/309* (2015.01); *H04L 1/004* (2013.01); *H04L 27/0014* (2013.01); *H04L 27/2666* (2013.01); *H04W 72/0446* (2013.01); *H04W 72/0453* (2013.01); *H04W 72/085* (2013.01); *H04W 72/1263* (2013.01); *H04W 76/10* (2018.02); *H04L 2027/0038* (2013.01)

(58) Field of Classification Search
None
See application file for complete search history.

(56) References Cited

U.S. PATENT DOCUMENTS

| | | | |
|---|---|---|---|
| 5,432,821 A | 7/1995 | Polydoros et al. | |
| 8,139,624 B1 * | 3/2012 | Snodgrass ............ | H04L 5/0082 375/219 |
| 10,042,852 B2 | 8/2018 | Boudreau et al. | |

(Continued)

OTHER PUBLICATIONS

International Search Report and Written Opinion dated Feb. 4, 2021 for International Patent Application No. PCT/US20/59812, 9 pages.

(Continued)

*Primary Examiner* — Bob A Phunkulh
(74) *Attorney, Agent, or Firm* — Perkins Coie LLP

(57) ABSTRACT

Devices, systems and methods for providing network-enabled connectivity for disadvantaged communication links in wireless networks are described. One example method for enabling connectivity over a disadvantaged link includes receiving, by a first node of a plurality of nodes from a source node in the first frequency band in a first timeslot, a first signal comprising a message, receiving, by the first node from at least a second node in a second frequency band in a second timeslot, a second signal that is used to generate a first reliability metric corresponding to the message, and performing, based on a plurality of reliability metrics corresponding to the message and the first reliability metric, a processing operation on the message, the first frequency band being non-overlapping with the second frequency band, and a duration of the first timeslot being greater than a duration of the second timeslot.

20 Claims, 11 Drawing Sheets

(51) Int. Cl.
*H04B 17/309* (2015.01)
*H04L 1/00* (2006.01)

(56) References Cited

U.S. PATENT DOCUMENTS

| | | | |
|---|---|---|---|
| 10,404,493 B2* | 9/2019 | Lee | H04L 25/024 |
| 2004/0185887 A1 | 9/2004 | Wolman et al. | |
| 2006/0268792 A1 | 11/2006 | Belcea | |
| 2008/0075033 A1 | 3/2008 | Shattil | |
| 2008/0075058 A1 | 3/2008 | Mundarath et al. | |
| 2008/0107044 A1 | 5/2008 | Blair et al. | |
| 2008/0310390 A1* | 12/2008 | Pun | H04W 48/12 370/347 |
| 2009/0310651 A1* | 12/2009 | Amde | H04B 1/7075 375/147 |
| 2011/0110345 A1 | 5/2011 | Hei et al. | |
| 2012/0088514 A1 | 4/2012 | Lee et al. | |
| 2012/0269146 A1 | 10/2012 | Pajukoski et al. | |
| 2013/0107726 A1 | 5/2013 | Hughes et al. | |
| 2014/0056212 A1 | 2/2014 | Blair et al. | |
| 2014/0161015 A1 | 6/2014 | Brown, III et al. | |
| 2016/0043883 A1 | 2/2016 | Zirwas | |
| 2016/0234753 A1 | 8/2016 | Ji et al. | |
| 2017/0026967 A1* | 1/2017 | Miesner | H04B 1/3822 |
| 2017/0055281 A1 | 2/2017 | Islam et al. | |
| 2017/0331644 A1 | 11/2017 | Urie et al. | |
| 2018/0027544 A1* | 1/2018 | Kimura | H04L 5/0016 370/330 |
| 2018/0359011 A1 | 12/2018 | Doostnejad et al. | |
| 2020/0014759 A1* | 1/2020 | Wunderlich | G06Q 10/0635 |
| 2020/0106588 A1* | 4/2020 | Gulati | H04J 11/0026 |
| 2020/0112337 A1* | 4/2020 | Teboulle | H04B 3/46 |

OTHER PUBLICATIONS

International Search Report and Written Opinion dated Oct. 13, 2020 for International Application No. PCT/US2020/042277, 10 pages.

Alizadeh, Ardalan, et al., "Optimal Beamforming in Two-Way Relay Networks with Cognitive Radio Capabilities", EICE Transactions on Communications, vol. E94-B, Issue 11, Nov. 2011, The Institute of Electronics, Information and Communication Engineers, Nov. 2011, pp. 3089-3097.

Berger, S., et al., "Carrier Phase Synchronization of Multiple Distributed Nodes in a Wireless Network", 8th IEEE Workshop on Signal Processing Advances for Wireless Communication (SPAWC), Helsinki, Finland, Jun. 2007, 5 pages.

Dong, Min, et al., "Optimal Multi-antenna Relay Beamforming with Per-Antenna Power Control", IEEE International Conference on Communications (ICC), Ottawa, Canada, IEEE, Jun. 10-15, 2012, pp. 2192-2196.

Kha, Ha Hoang, et al., "Optimization of Cooperative Beamforming for Sc-Fd Ma Multi-User Multi-Relay Networks by Tractable D.C. Programming,", IEEE Transactions on Signal Processing, vol. 61, Issue 2, IEEE, Jan. 15, 2013, pp. 467-479.

Mudumbai, R., et al., "Distributed Transmit Beamforming: Challenges and Recent Progress", IEEE Communications Magazine, vol. 47, No. 2 Feb. 2009, pp. 102-110.

Ramezani-Kebrya, Ali, et al., "Optimal Cooperative Relay Beamforming for Interference Minimization", Wireless Communications Symposium, Proceedings of IEEE International Conference on Communications (ICC), London, United Kingdom, IEEE, Jun. 11, 2015, pp. 2500-2505.

* cited by examiner

US 11,317,427 B2

NETWORK-ENABLED CONNECTIVITY FOR DISADVANTAGED COMMUNICATION LINKS

TECHNICAL FIELD

This document is directed to collaborative wireless communications amongst nodes in a wireless network.

BACKGROUND

Ad-hoc networks may include spatially distributed, single-antenna, power-limited radio nodes, which may be dynamic, not fully connected, and operating in multipath fading propagation environments. These nodes can collaborate to communicate with a remotely-located radio node, which is not reachable via straightforward communication protocols.

SUMMARY

This document relates to methods, systems, and devices for providing network-enabled connectivity for disadvantaged communication links in wireless networks. Embodiments of the disclosed technology can be configured to provide range extension, i.e., the ability to transmit and receive messages collaboratively to a remote node that is otherwise unreachable by a single local radio or even by multiple radios transmitting simultaneously in a phase-incoherent manner. The collaborative communication technology disclosed in this patent document can be implemented in various devices including wireless communication receivers in wireless communication systems, including, e.g., radio communication devices, mobile devices and hot-spots in broadband wireless networks.

In one exemplary aspect, a method for enabling connectivity over a disadvantaged link is disclosed. The method includes receiving, by a first node of a plurality of nodes from a source node in the first frequency band in a first timeslot, a first signal comprising a message; receiving, by the first node from at least a second node in a second frequency band in a second timeslot, a second signal that is used to generate a first reliability metric corresponding to the message; and performing, based on a plurality of reliability metrics corresponding to the message and the first reliability metric, a processing operation on the message, the first frequency band being non-overlapping with the second frequency band, and a duration of the first timeslot being greater than a duration of the second timeslot.

In another exemplary aspect, a method for enabling connectivity over a disadvantaged link is disclosed. The method includes performing, by a first node of a plurality of nodes in a first frequency band in a first timeslot, one or more communications with at least a second node of the plurality of nodes; receiving, by the first node from at least the second node of the plurality of nodes in a second frequency band, a local probe; receiving, by the first node from a destination node in the second frequency band in a second timeslot, a probe; computing, based on the one or more communications, the probe and the local probe, a phase correction; and transmitting, to the destination node in the second frequency band, a message with the phase correction, the first frequency band being non-overlapping with the second frequency band, and a duration of the first timeslot being greater than a duration of the second timeslot.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

A mobile ad hoc network (MANET) is a continuously self-configuring, infrastructure-less network of mobile devices connected wirelessly. A MANET typically includes spatially-distributed, single-antenna, power-limited radio nodes, which may be both terrestrial and non-terrestrial. In an example, the network may be dynamic (nodes are moving), and may not be fully connected (multiple hops may be needed for full network coverage). In another example, the radios may operate in multipath fading propagation environments, and may employ constant-envelope (CE) modulations for increased power efficiency. In yet another example, the network may communicate with a remote (or destination) node that is otherwise unreachable by a single local radio or even by multiple radios transmitting simultaneously in a phase-incoherent manner.

Figure 1A:
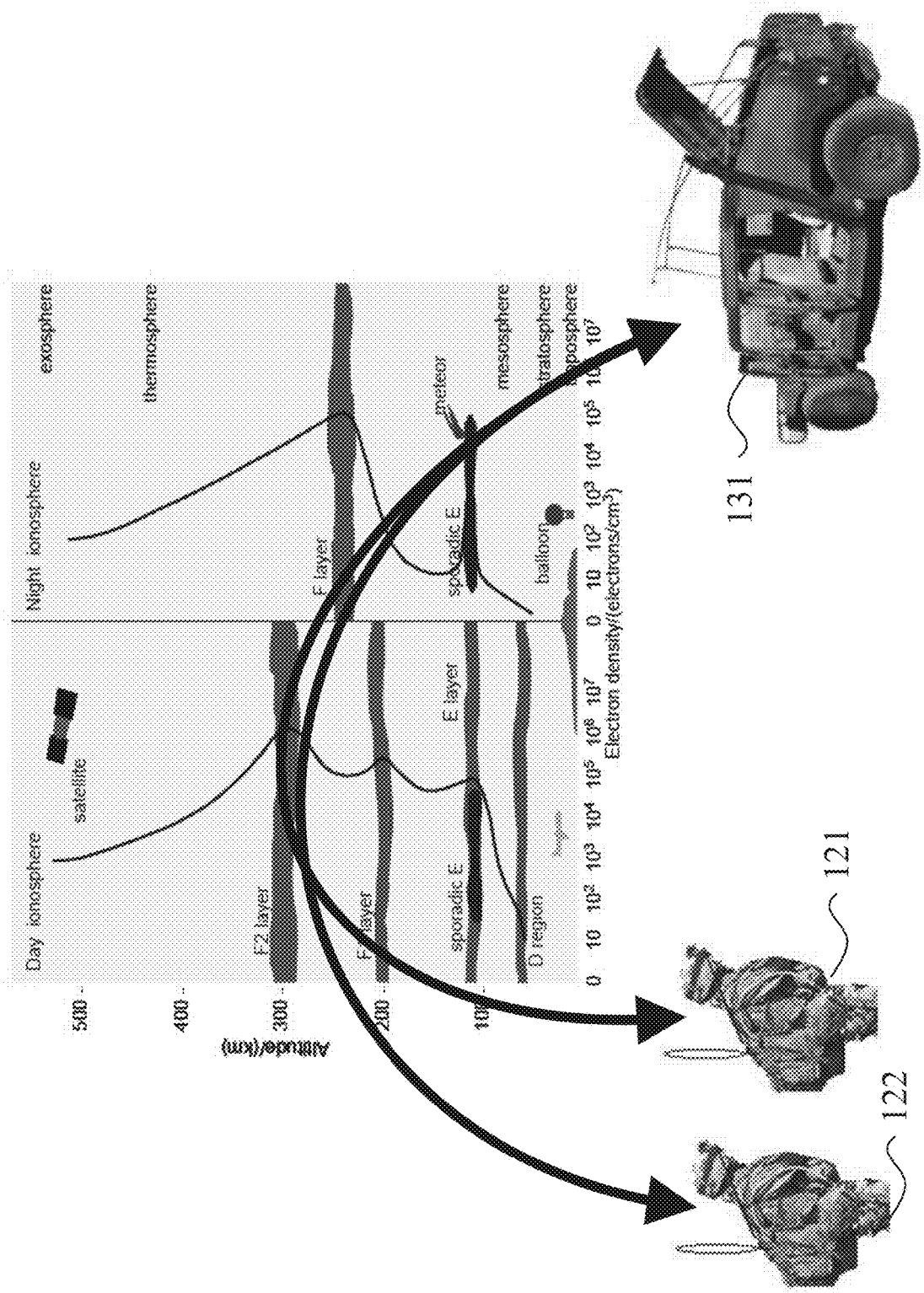
FIG. 1A shows an example of a communication system that implements embodiments of the disclosed technology.

FIG. 1A shows an example of a high-frequency (HF) communication system, which typically uses frequencies between 3 MHz and 30 MHz. Because radio waves in this band can be reflected back to Earth by the ionosphere layer in the atmosphere a method known as "skip" or "skywave" propagation these frequencies are suitable for long-distance communication across intercontinental distances and for mountainous terrains which prevent line-of-sight (LOS) communications. In an example, an HF communication is characterized by a sky wave rather than a ground wave being able to propagate from a transmitter to a receiver, and is referred to as HF near-vertical incident skywave (HF-NVIS) communications.

Section headings are used in the present document to improve readability of the description and do not in any way limit the discussion or embodiments (and/or implementations) to the respective sections only.

Difficulties of Mobile HF Communications

HF communications are typically used by radio amateurs (ham radio operators) and for military communications, and especially in the tropics. The radio waves travel near-vertically upwards into the ionosphere, where they are refracted back down and can be received within a circular region up to 650 km from the transmitter. If the frequency is too high (that is, above the critical frequency of the ionospheric F layer, shown in FIG. 1), refraction fails to occur and if it is too low, absorption in the ionospheric D layer may reduce the signal strength.

Typical HF antennas configurations include a horizontally polarized (parallel with the surface of the earth) radiating element that is from 1/20th wavelength ($\lambda$) to 1/4th $\lambda$, above the ground (for a nominal 10 MHz frequency, $1/20\lambda \approx 5$ ft and $1/4\lambda \approx 25$ ft). That proximity to the ground forces the majority of the radiation to go straight up. Overall efficiency of the antenna can be increased by placing a ground wire slightly longer than the antenna parallel to and directly underneath the antenna.

The size of the typical HF antenna makes mobile HF communications fairly cumbersome. The efficacy is further impacted by time-varying frequency availability due to changing ionospheric conditions (e.g., day ionosphere vs night ionosphere shown in FIG. 1), limited transmission power due to electromagnetic interference (EMI) considerations, and small antennas being relatively lossy.

Figure 1B:
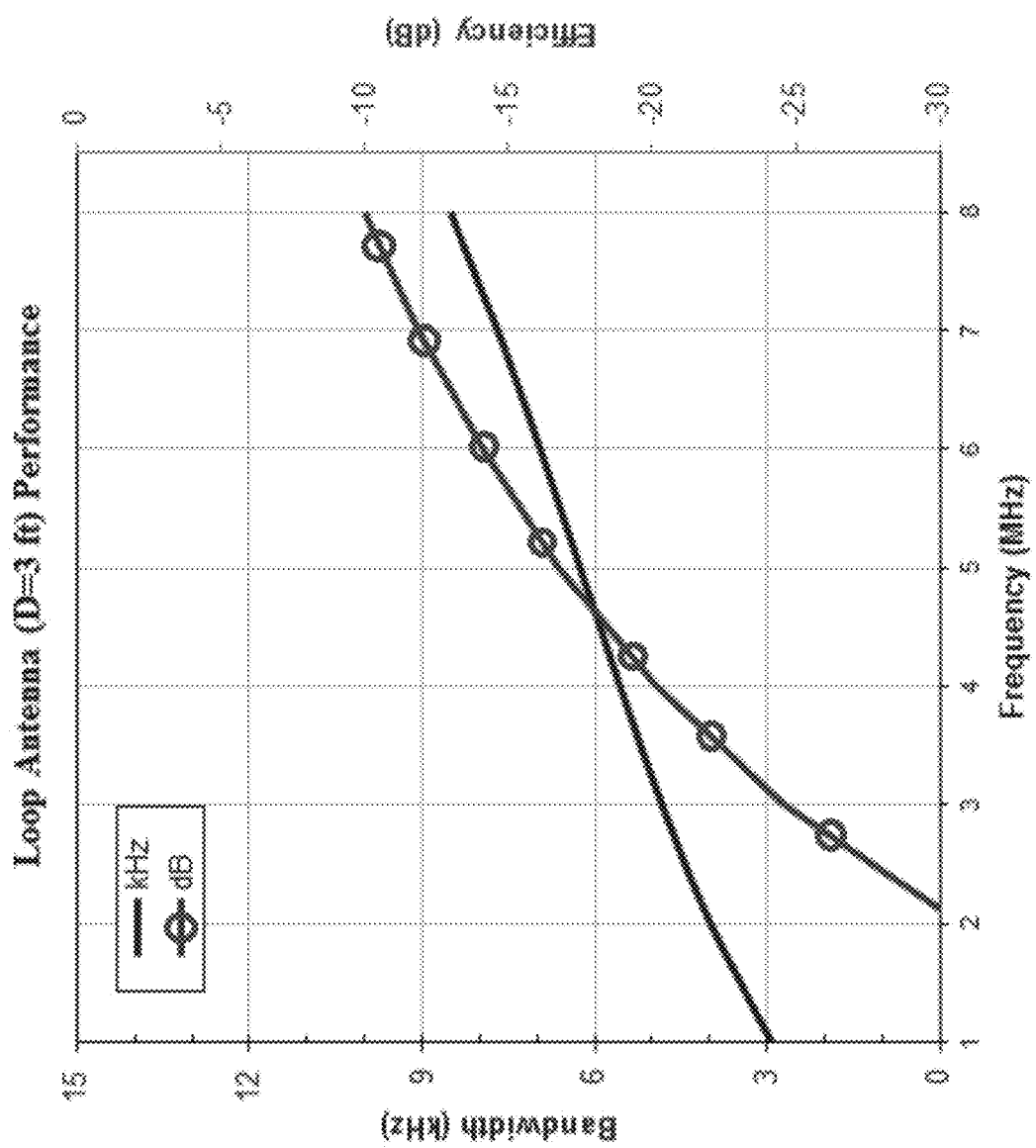
FIG. 1B shows an example of performance of a loop antenna for mobile HF NIVIS communication.

FIG. 1B shows an example of performance of a loop antenna for mobile HF communication (e.g., used by the mobile soldier 121 in FIG. 1A) with a 3 ft diameter and 10 W (40 dBm) input power. As shown in FIG. 1B, for a nominal frequency of 5 MHz, a bandwidth of 6 kHz results in the antenna operating with −15 dB efficiency, producing an output power of only 25 dBm. Typically, a vehicular antenna (e.g., used by the vehicle 131 in FIG. 1A) operating at 150 W input power has an efficiency that is 6 dB greater than the loop antenna described in the context of FIG. 1B.

For the nominal mobile and vehicular nodes shown in FIG. 1A (and using, for example, the antenna described in FIG. 1B), point-to-point reliable communication rates are very low, e.g., voice transmissions at 2.4 kbps are only possible in benign ionospheric conditions. Embodiments of the disclosed technology advantageously enable collaboration between the mobile network nodes (e.g., nodes 121 and 122 in FIG. 1A) to overcome the inefficiencies of the disadvantaged HF link for both downlink and uplink communications. The mobile nodes can be configured to perform local communications over a frequency band distinct from the frequency band used for the HF link. In an example, the local communications for the collaborative downlink may be performed using VHF (operating in 30-300 MHz), UHF (operating in 300 MHz to 3 GHz), L-band (operating in 1-2 GHz) or S-band (operating in 2-4 GHz). In the case of the collaborative uplink (also referred to as collaborative beam-forming), the VHF frequency band is used for the local communication network.

Exemplary Embodiments of a Collaborative Downlink

Embodiments of the disclosed technology provide methods for local connected nodes that receive the same message over different channels, and subsequently collaborate to operate as a distributed multi-antenna receiver. In an example, the collaboration includes each mobile node performing their own decoding operation and then exchanging soft-decisions.

Figure 2B:
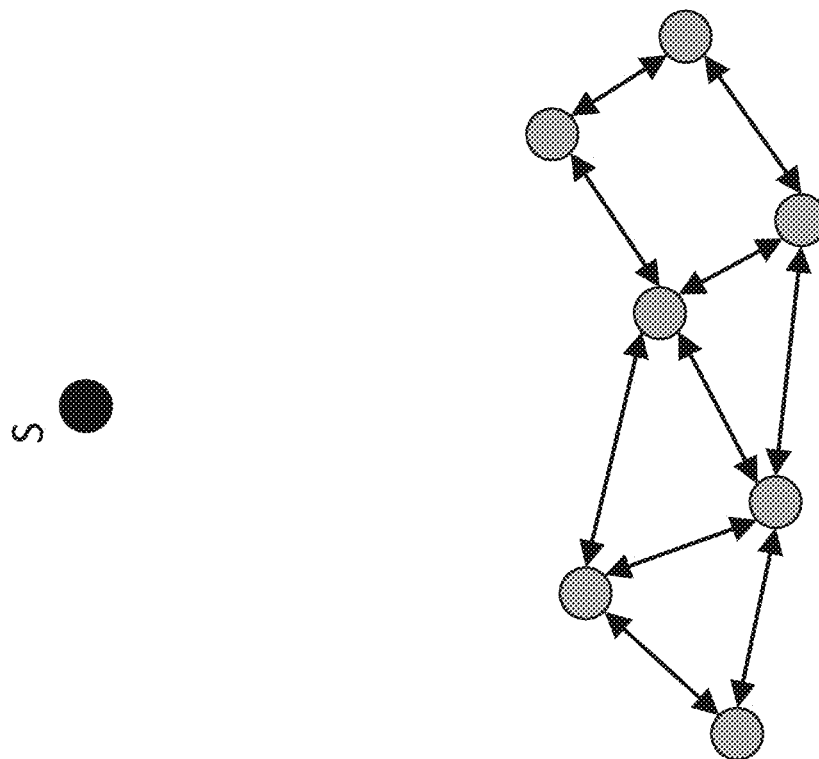
FIGS. 2A and 2B show the stages of an exemplary embodiment for a collaborative downlink, in accordance with the disclosed technology.
Figure 2A:
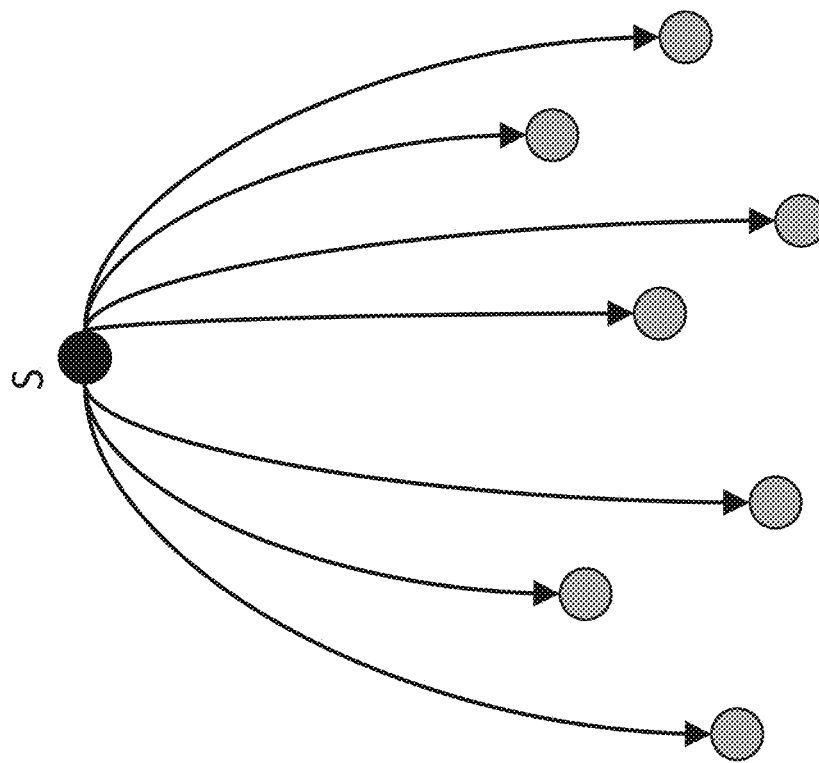

FIGS. 2A-2B show the two stages of an exemplary embodiment for a collaborative downlink, in accordance with the disclosed technology.

FIG. 2A shows an example of the first broadcast stage, wherein the disadvantaged HF downlink is used to broadcast a message from the source node (e.g., the vehicular node 131 in FIG. 1A) destination to each of the mobile nodes (e.g., nodes 121 and 122 in FIG. 1A, and shaded grey in FIG. 2A). In some embodiments, the source node (S) in FIG. 2A may generate the message that is broadcast. In other embodiments, the source node may receive the message from a node outside the network (e.g., a drone or a satellite). In yet other embodiments, the message may be received from a backbone-type network (e.g., a high-speed optical network) distinct from the HF and L-band (or VHF or S-band) networks.

FIG. 2B shows an example of the second message-sharing stage, wherein each of the mobile nodes first attempt to decode the message received from the destination node over the disadvantaged HF link in the first stage (shown in FIG. 2A). The mobile nodes then distribute reliability metrics (e.g., quantized log-likelihood ratios (LLRs)) using the L-band network such that each of the nodes receives collaboration messages from the other nodes. Each of the nodes now perform a second attempt to decode the message using the original reception as well as the reliability metrics that were exchanged in this stage.

In some embodiments, the distribution of the reliability metrics is performed using a round-robin protocol, wherein the LLRs are transmitted one node at a time based on the ranking of quality metrics (e.g., based on the first round of decoding). In an example, the quality metric may be a symbol error rate (SER), a bit error rate (BER), a signal-to-noise ratio (SNR) or a signal-to-interference plus noise ratio (SINR). In another example, the quality metrics may be based on the output of an equalizer or an FEC decoder. In other embodiments, the mobile nodes may simultaneously and synchronously transmit explicit LLRs or incorrect hard decisions.

Figure 3A:
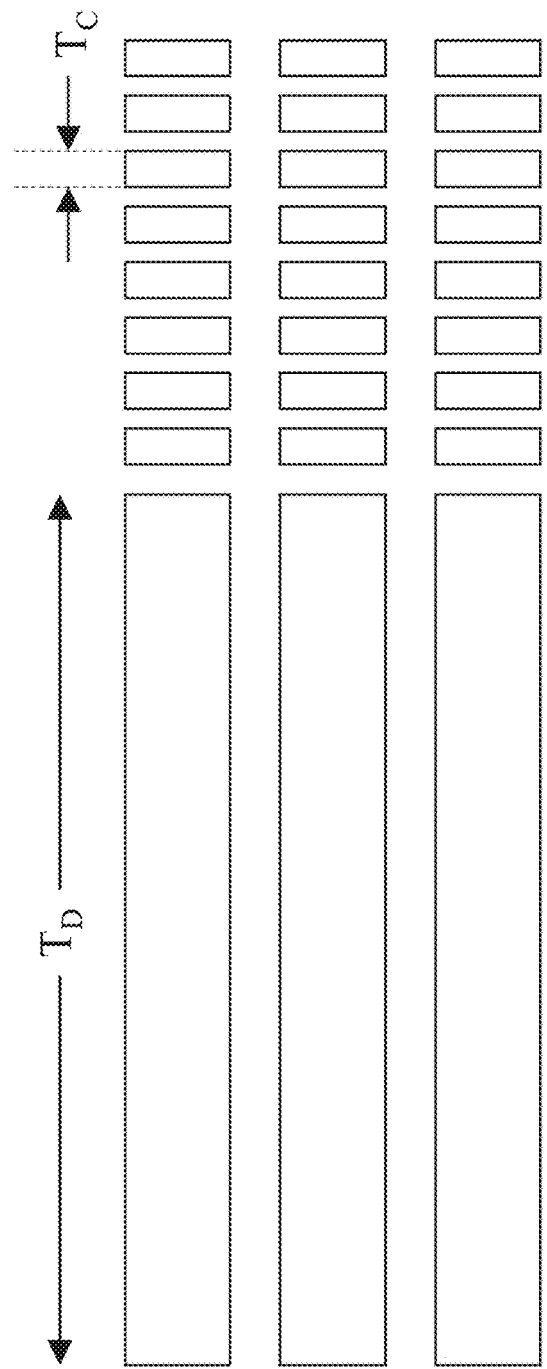
FIG. 3A shows an example of time multiplexing for the collaborative downlink.

FIG. 3A shows an example of time multiplexing for the collaborative downlink. As shown therein, the downlink data is transmitted over the $T_D$ sec timeslot, which is substantially longer than the $T_C$ sec timeslot used for the collaboration messages. In an example, 10 kbps may be supported on the data downlink with $T_D$=100 msec, and the collaboration messages are communicated at 8 Mbps with $T_C$=0.5 msec, which corresponds to a 4% collaboration overhead when there are 8 mobile nodes. In another example, the time multiplexing scheme may be used when the reliability metrics are distributed using the round-robin protocol described above.

Figure 3B:
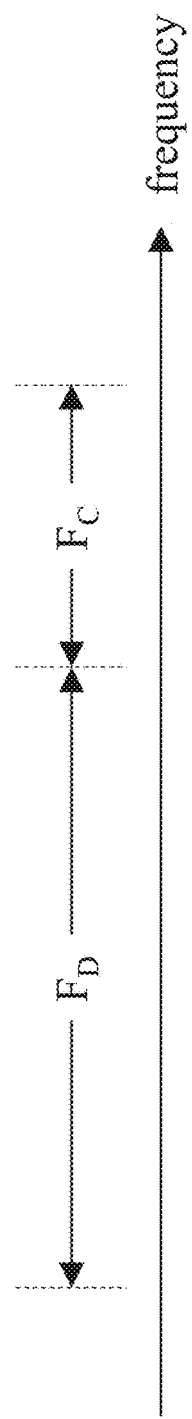
FIG. 3B shows an example of frequency multiplexing for the collaborative downlink.

FIG. 3B shows an example of frequency multiplexing for the collaborative downlink. As shown therein, the downlink data is transmitted over a first bandwidth (denoted $F_D$) and the collaboration messages are communicated between the mobile nodes over a second bandwidth (denoted $F_C$) that is non-overlapping with the first bandwidth. In the frequency multiplexing scenario, the collaboration messages corresponding to a first data message may be exchanged (over $F_C$) concurrently with the reception of a second data message (over $F_D$).

Figure 4:
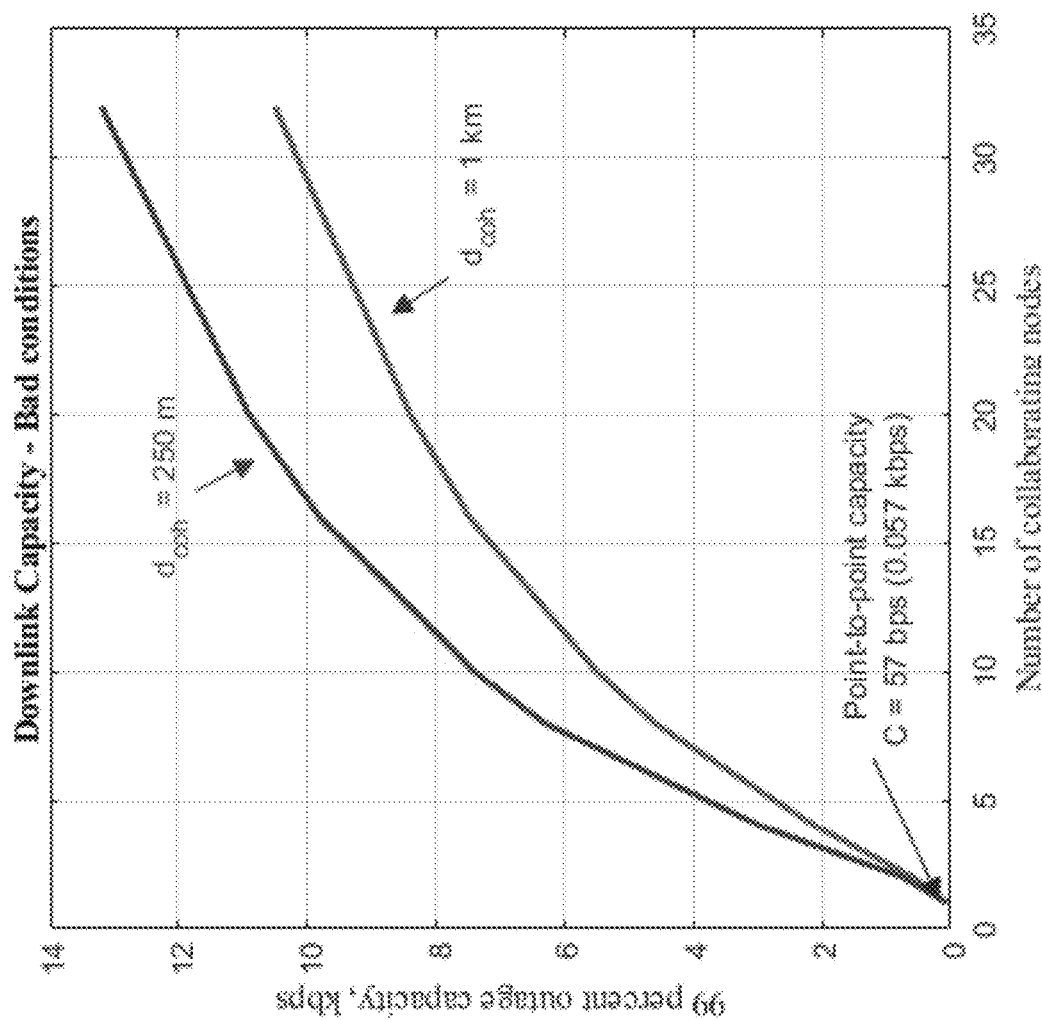
FIG. 4 shows exemplary results of the capacity of the collaborative downlink.

FIG. 4 shows exemplary results of the collaborative downlink capacity, wherein the 99% outage capacity (in kilobits per sec, kpbs) is plotted as a function of the number of collaborating nodes, and assumes that the network nodes are spread over a distance of 1 km, and the vehicular node uses a center frequency of 4 MHz, a transmit power of 50 dBm and an antenna gain of −12 dBi. The 99% outage capacity is plotted for a coherence distance ($d_{coh}$) of 250 m and 1 km, wherein the coherence distance is defined as the distance between network nodes over which the channels for two nodes remain at least 75% correlated. As shown in FIG. 4, there is an almost 100× improvement in capacity when 10 nodes collaborate in the worst correlation conditions.

Exemplary Embodiments of a Collaborative Uplink

Embodiments of the disclosed technology provide methods of phase adjustment for enabling distributed beamforming in relevant scenarios with real-world radio constraints, RF degradations and multipath propagation. Furthermore, local mechanisms for data sharing and collaborative transmission with coarse timing synchronization across the radios, which are typically available in different wireless networking technologies, are leveraged.

The present document describes distributed collaborative beamforming from a set of spatially-distributed radio network nodes $N_i$; i=1, 2, . . . , K, towards a remote collaborating radio destination node D. In some embodiments, a method for distributed collaborative beamforming in a network comprising multiple network nodes (or nodes, or radios) comprises four stages.

Stage 1. Each network node gets possession of a common message sent by a source S, which is the message to be beam-formed towards the destination D.

Stage 2. The network nodes self-cohere via a sequence of bidirectional signal exchanges (or a combination of signal and message exchanges), performed between chosen pairs of nodes. This results in all nodes in the network having been included in the self-coherence process and having derived and stored a phase correction value.

Stage 3. Each network node receives a broadcast probe signal from the destination node D. Based on this probe, each network node estimates a complex-valued, multipath-fading baseband channel model, identifies the strongest tap in the channel model, and computes the phase (argument) of the strongest complex-valued tap. In some embodiments, all the network nodes receive the probe from the destination at roughly the same time (e.g., within a timeslot, or within adjacent timeslots).

Stage 4. Each network node quasi-synchronously (e.g., within a pre-defined turn-around time upon destination-probe reception) transmits the common message with a total correction phase added to the phase (argument) of the complex baseband values representing the information stream (of the common message). The total correction phase is equal to the negative of the sum of the node's phase correction value (as derived in Stage 2) and the phase (argument) of the strongest complex-valued tap (as estimated in Stage 3).

In some embodiments, and for constant-envelope modulated signals, baseband phase correction can be implemented simply by an index shift into the look-up table that generates the information carrying digital phase sequence, thereby maintaining the constant envelope property for the transmitted signal.

In some embodiments, a network node may perform the four stages in an order different from that described above, as long as Stage 4 (which includes the actual beamforming operation) is performed last. For example, the network node may first receive a probe from the destination and compute the phase of the strongest tap of the channel estimation (Stage 3), then receive the common message (Stage 1), followed by participating in the self-coherence process with the other network nodes to derive its phase correction value (Stage 2), and finally perform the beamforming operation (Stage 4). For another example, the network node may first participate in the self-coherence process with the other network nodes to derive its phase correction value (Stage 2), then receive a probe from the destination and compute the phase of the strongest tap of the channel estimation (Stage 3), followed by receiving the common message (Stage 1), and finally perform the beamforming operation (Stage 4).

In some embodiments, the four-stage process described above produces a composite (co-transmitted, superimposed) signal at the destination node which has a larger signal-to-noise ratio (SNR) than what would have been received had the nodes co-transmitted in a phase-incoherent manner, thereby producing a distributed beamforming gain.

In some embodiments, the four-stage process described above can be adapted to simultaneously distribute the common message to multiple destinations.

FIGS. 5A-5D show the four stages of an exemplary embodiment for a collaborative uplink, in accordance with the disclosed technology.

Figure 5B:
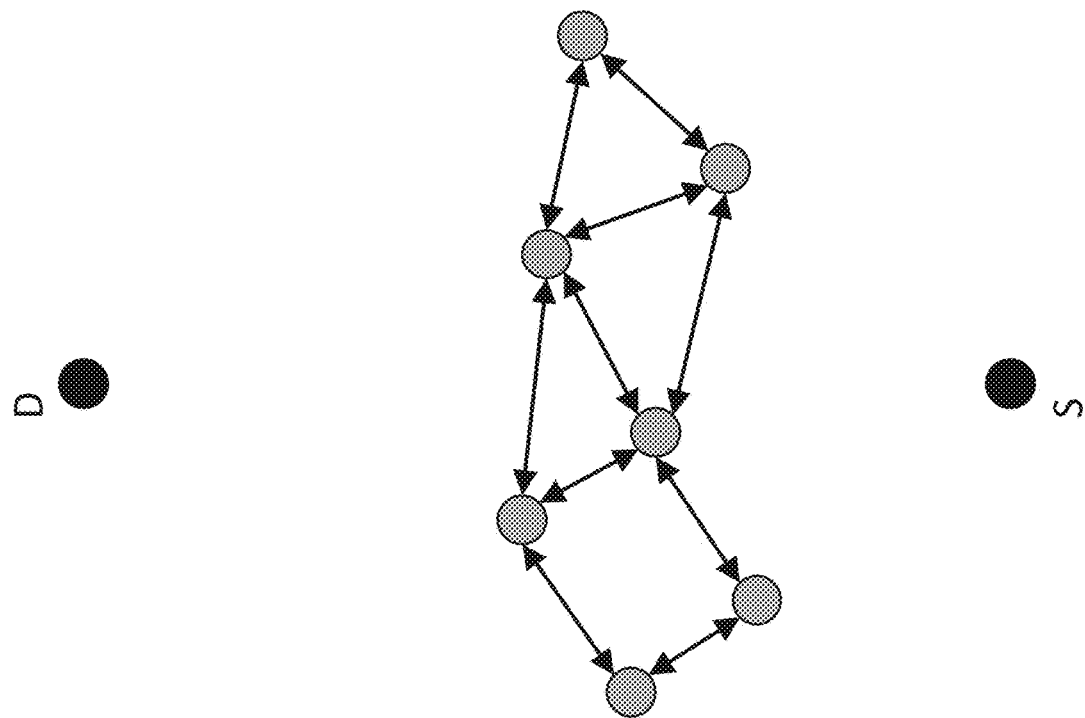
FIGS. 5A-5D show the stages of an exemplary embodiment for a collaborative uplink, in accordance with the disclosed technology.
Figure 5A:
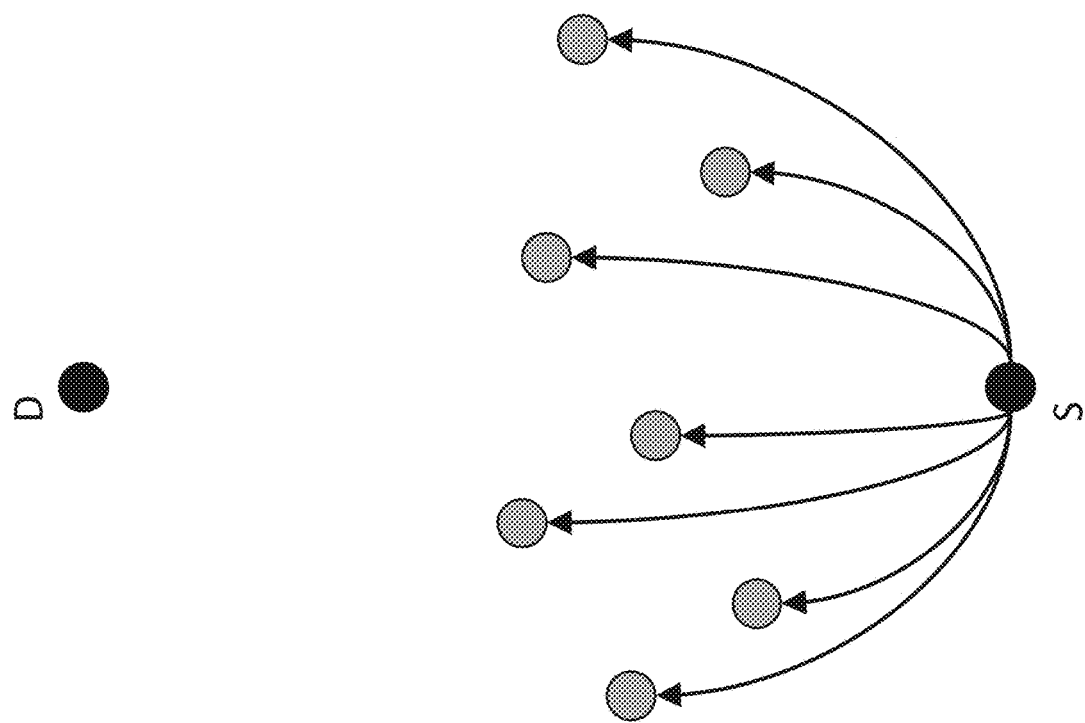

FIG. 5A shows an example of the first message-sharing stage, wherein the K network nodes (shaded grey) get possession of a common message from a source (S). In some embodiments, the message can be distributed via broadcast transmission by one of the network nodes (which also acts as the source in this first stage). In other embodiments, it may be broadcast by a source outside the network of K nodes (e.g., a drone or a satellite broadcasting this common message to a terrestrial network so that this network may further relay the message to D, otherwise unreachable by the source). In yet other embodiments, it may be shared via a backbone-type network (e.g., a high-speed optical network) distinct from the radio network.

FIG. 5B shows an example of the second self-coherence stage. In some embodiments, the purpose of the self-coherence process is to produce the matrix $\Delta\emptyset=\{\delta\emptyset_{ij}\}$; i≠j; i,j=1, 2, . . . , K, where $\delta\emptyset_{ij}=2(\partial_i-\partial_j)$, where $\partial_i$ is the phase of the free-running, carrier-producing oscillator of radio node $N_i$. By definition, $\delta\emptyset_{ii}=0$ for any i. In an example, and as shown in FIG. 2B, this is achieved through a sequence of bi-directional probe-signal exchanges (or signal and message exchanges) between pairs of nodes (i,j).

Once the matrix $\Delta\emptyset$ has been computed fully, a selection process identifies a proper column with desirable characteristics. The column is indexed by the so-called reference node $N_r$, e.g., the column $[\delta\emptyset_{1r}, \delta\emptyset_{2r}, \ldots, \delta\emptyset_{Kr}]$ is computed and stored at each node. The values $\delta\emptyset_{ir}$, i=1, 2, . . . , K, comprise the set of required correction phases that are used in the beamforming stage (Stage 4).

In some embodiments, the matrix $\Delta\emptyset$ is computed by electing a priori a reference node, and computing only the reference column $[\delta\emptyset_{1r}, \delta\emptyset_{2r}, \ldots, \delta\emptyset_{Kr}]$.

In other embodiments, the matrix $\Delta\emptyset$ is computed by performing a round-robin computation, starting from a chosen start node and proceeding sequentially, whereby each node i in the sequence selects its paired node j on the basis of the highest SNR from all links connected to it, the same is repeated by j, provided that the next selected pair node has not already been already covered before, and so on, until all nodes are exhausted. In another example, other link metrics (e.g., the highest signal-to-interference-plus-noise ratio (SINR)) may be used to select the next paired node.

In yet other embodiments, some entries of the matrix $\Delta\varnothing$ may be determined via the use of the identities $2\Delta\theta_{ij}=-2\Delta\theta_{ji}$ and $2\Delta\theta_{ij}=2\Delta\theta_{ik}+2\Delta\theta_{kj}$ (the latter named the "triangle identity"). Alternatively, all entries in $\Delta\varnothing$ are computed using the said identities plus an estimate of the quality (error variance) of the estimated value $\delta\varnothing_{ij}$.

For the computation of the matrix $\Delta\varnothing$ in the embodiments described above, neither a fully-connected network (e.g., radio nodes in multiple hops may participate) nor a static network (e.g., dynamic phase tracking may be included in the computation) is required. In some embodiments, the value $\delta\varnothing_{ij}$ can be computed in one of two ways: either via pure bidirectional exchanges of signals or via a mixture of signal exchanges and message exchanges.

Bidirectional signal exchanges. In some embodiments, a pure bidirectional exchange between nodes $N_i$ and $N_1$ includes the node $N_i$ first emitting a signal, e.g., a probe akin to a tone, i.e. $s_i^{pb}(t)=\cos(2\pi f_c t+\partial_i)$.

In complex-envelope notation, the tone $s_i^{pb}(t)=\text{Re}\{e^{j\partial_i}e^{j2\pi f_c t}\}$ and the complex envelope is $\tilde{s}_i^{pb}(t)=e^{j\partial_i}$. A transmission induces a positive phase shift of $\partial_i$ to the transmitted carrier $\cos(2\pi f_c t)$. Correspondingly, the receiver of node $N_j$ mixes the incoming signal with $\cos(2\pi f_c t+\partial_j)$, and thus any reception equivalently subtracts the local phase $\partial_j$. Neglecting the channel gain scaling, the intervening narrowband channel multiplies with the phasor $$e^{j\partial_{i\rightarrow j}^{ch}},$$

therein adding the random-variable phase of $\partial_{i\rightarrow j}^{ch}$, and the total phase at the receiver node $N_j$ is $\theta_{i\rightarrow j}^{total}=\partial_i+\partial_{i\rightarrow j}^{ch}-\partial_j$.

In this exemplary pure bi-directional exchange, node $N_j$ produces, at baseband, the negative of the total phase $-\theta_{i\rightarrow j}^{total}=-\partial_i-\partial_{i\rightarrow j}^{ch}+\partial_j$ (referred to as "conjugation" or "phase reversal"). Upon up-conversion (which adds the phase $\partial_j$), propagation through the reciprocal channel (which adds the phase $\partial_{i\rightarrow j}^{ch}$ and thus cancels the term $-\partial_{i\rightarrow j}^{ch}$) and down-conversion at node $N_i$ (which subtracts the phase $\partial_i$), the total phase at the radio baseband of node $N_i$ is $\theta_{i\rightarrow j}^{total}=(-\partial_i-\partial_{i\rightarrow j}^{ch}+\partial_j)+\partial_j+\partial_{i\rightarrow j}^{ch}-\partial_i=2(\partial_j-\partial_i)=-\theta\varnothing_{ij}$.

In some embodiments, node $N_j$ can be informed of this value through the messaging protocol. In other embodiments, node $N_j$ can initiate its own bidirectional exchange with node $N_j$ in order to compute $\delta\varnothing_{ji}$.

Although, in principle, $\delta\varnothing_{ji}=-\delta\varnothing_{ij}$, in practice, such estimates may be noisy. In some embodiments, the network protocol may allow for message exchanges between nodes, and a better estimate of $\delta\varnothing_{ij}$ can be made by both nodes by averaging the individual estimates.

Message and signal exchanges. In some embodiments, a mixture of signal and message exchanges includes the node $N_i$ initiates the emission of a probe, as before, and node $N_j$ computes $\theta_{i\rightarrow j}^{total}=\partial_i+\partial_{i\rightarrow j}^{ch}-\partial_j$, as described above. In this embodiment, Node $N_j$ sends, to node $N_i$, an information-carrying message containing this computed value of $\theta_{i\rightarrow j}^{total}$. Contemporaneously with this message, node $N_j$ emits a probe signal, so that node $N_i$ can in turn compute the phase $\theta_{j\rightarrow i}^{total}=\partial_j+\partial_{j\rightarrow i}^{ch}-\partial_i$. Under the assumption of channel reciprocity, $\partial_{i\rightarrow j}^{ch}=\partial_{j\rightarrow i}^{ch}$. Thus, node $N_i$ possesses knowledge of $\theta_{i\rightarrow j}^{total}$ as well as $\theta_{j\rightarrow i}^{total}$ and can easily infer that $\theta_{i\leftrightarrow j}^{total}=\theta_{j\rightarrow i}^{total}-\theta_{i\rightarrow j}^{total}=-\delta\varnothing_{ij}$.

In some embodiments, and as described in the context of bidirectional signal exchanges, the nodes can repeat that process by now starting from $N_j$, or can share the estimated value of $\delta\varnothing_{ij}$ via messaging.

Figure 5D:
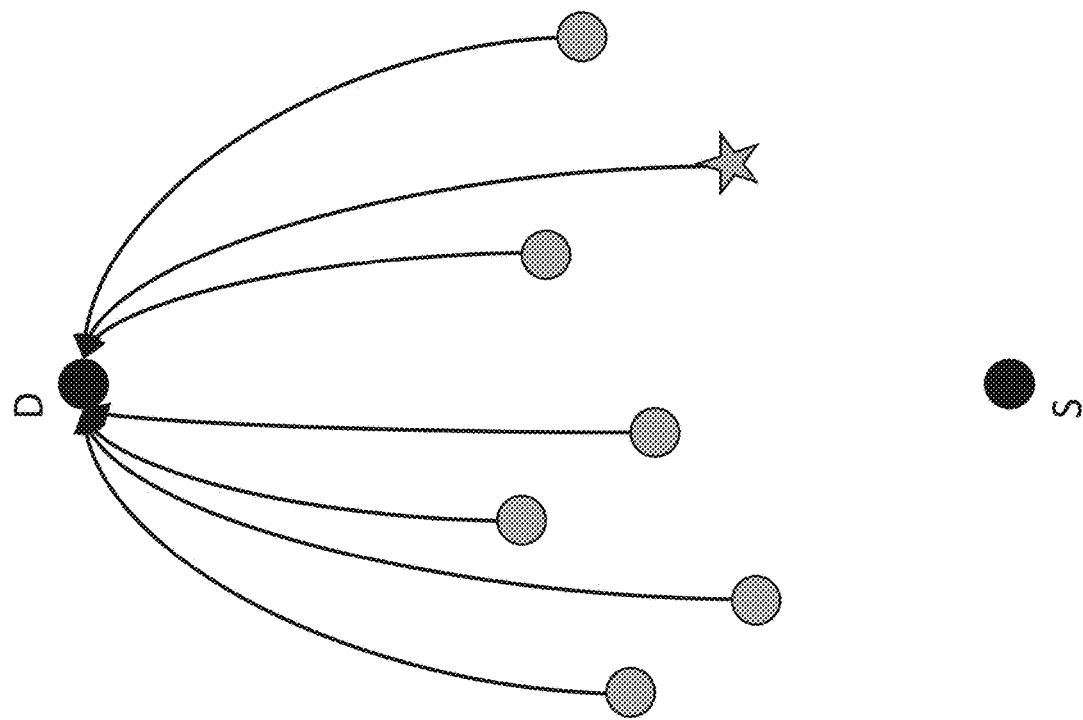
Figure 5C:
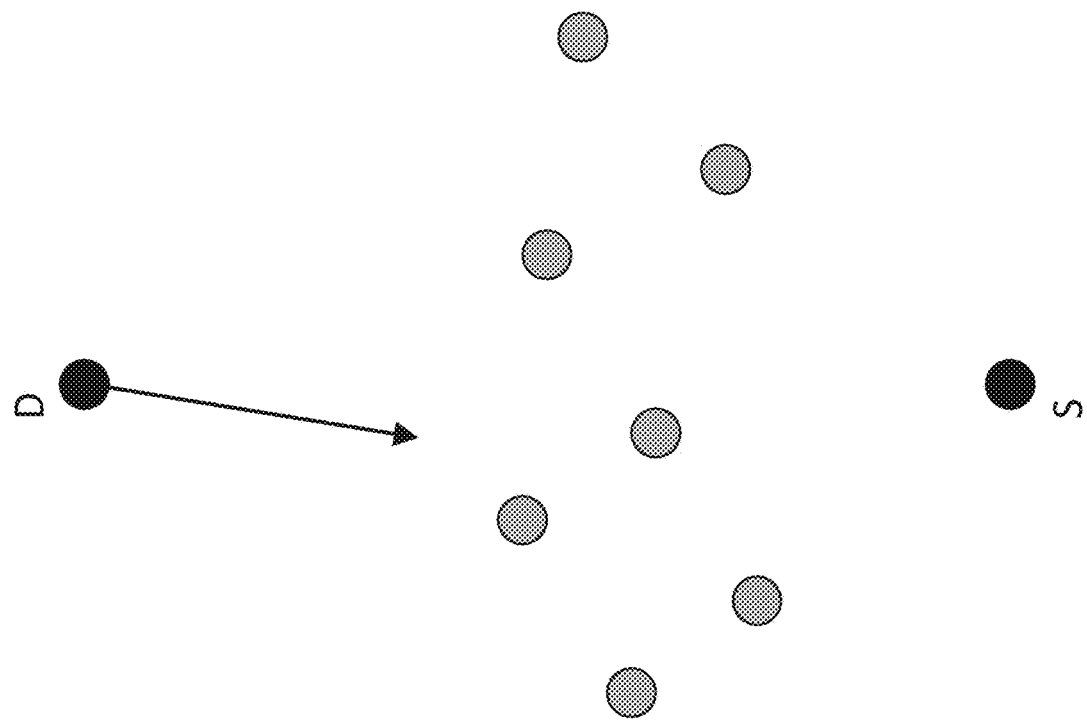

FIG. 5C shows an example of the third per-node phase estimation stage. In some embodiments, the destination node (D) broadcasts a probe, and each of the network nodes computes a tap-spaced, complex-valued baseband channel model in response to receiving the probe from the destination node. At each node, the magnitudes of the estimated taps are compared and the largest is selected, and then used to compute an argument (phase) estimate $\partial_i^{str\_tap}$ for each node $i=1, 2, \ldots, K$.

FIG. 5D shows an example of the fourth destination beamforming stage. In some embodiments, the transmission from node $N_i$ is performed with a total correction phase given by $\partial_i^{total\_corr}=-\partial_i^{str\_tap}-\delta\varnothing_{ir}$.

In some embodiments, the distributed collaborative beamforming process described in the context of FIGS. 5A-5D results in the destination node D receiving a multitude of taps. The taps arriving at D include (i) those that have been subjected to the processing of Stage 3 and have been subsequently transmitted with the proper phase $\partial_i^{total\_corr}$ from each node $N_i$, and (ii) all the remaining taps which have not been processed as per Stage 3 (namely, all taps except the selected strongest). All selected and processed taps contributing to the superimposed (co-transmitted) baseband channel model at the destination node D are in principle phase-aligned, with a common complex-baseband argument (phase) equal to $\delta\varnothing_{rD}$, thus producing a coherent beamforming gain modulo $\delta\varnothing_{rD}$. The remaining non-selected and non-processed channel taps coming from all nodes and contributing to the superimposed channel at D act as non-coherent taps and do not provide beamforming gain, although they provide noncoherent power gains.

In some embodiments, the self-coherence process (Stage 2) may be implemented between the network nodes using the VHF-band channel (e.g., the collaboration slots in FIG. 3A or the second bandwidth ($F_C$) in FIG. 3B), the remote destination node may broadcast a probe over the HF channel that is received by the nodes and used to compute the strongest tap of a channel estimate (Stage 3), and the nodes could finally perform the beamforming over the HF channel in order to transmit a common message to the remote destination node (Stage 4). In an example, the remote destination may be a seafaring vessel in the littoral zone and the network nodes may be members of a landing party.

Embodiments of the disclosed technology can support distributed collaborative beamforming in a dual-channel framework by ensuring the total correction phase for beamforming (Stage 4) is computed for the HF communication channel, even though the VHF-band is used when performing the self-coherence process (Stage 3). The term is derived based on the probe from D and is with respect to the HF channel, but the term is derived using the VHF-band self-coherence process, and must be converted to the HF band to ensure the correct computation of the total correction phase.

In some embodiments, the term $\delta\varnothing_{ir}$ is derived for the HF (or HF-NVIS) band by ensuring that the VHF-band and HF-band oscillators are physically coupled in the radios. In other embodiments, the nodes could use the ground wave of any HF communication to perform the self-coherence process.

Figure 6:
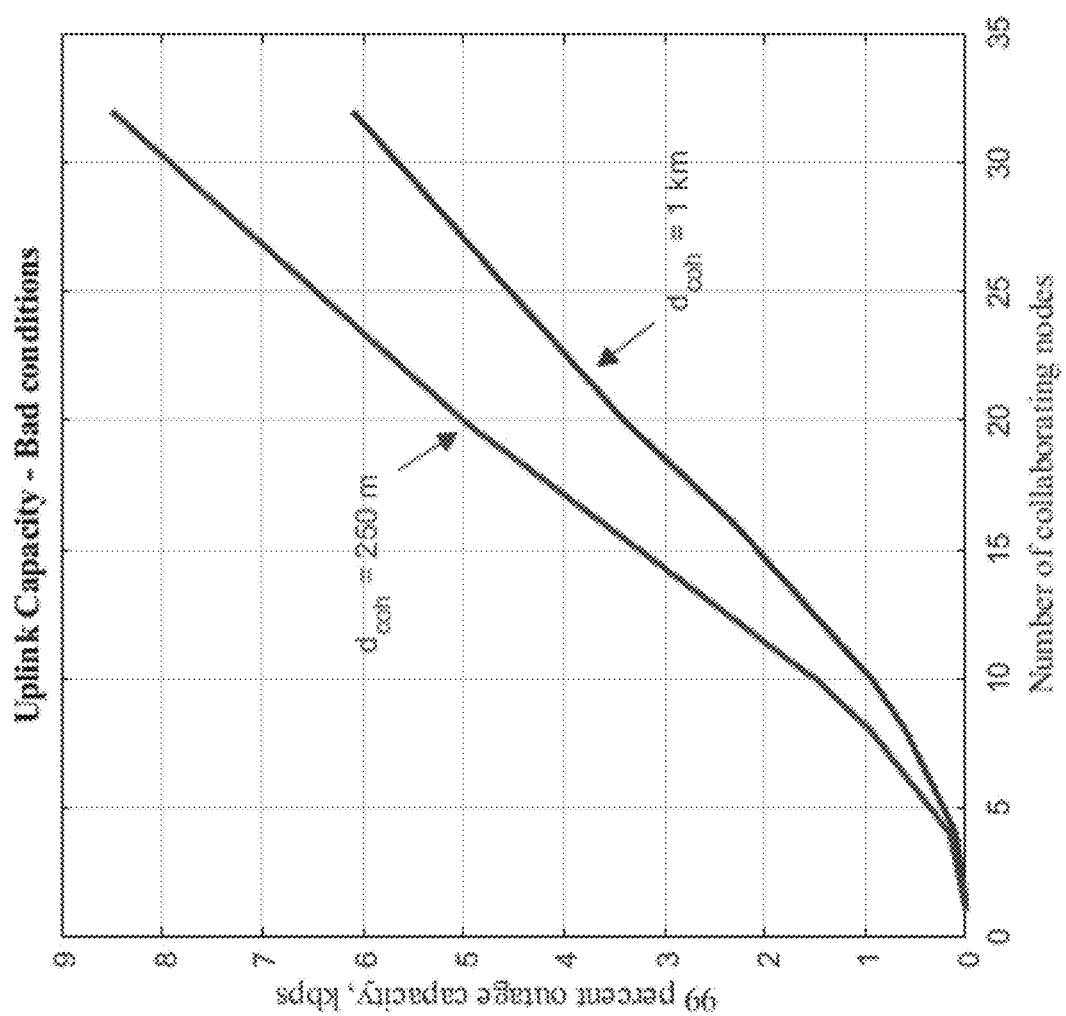
FIG. 6 shows exemplary results of the capacity of the collaborative uplink.

FIG. 6 shows exemplary results of the capacity of the collaborative uplink, wherein the 99% outage capacity (in kilobits per sec, kpbs) is plotted as a function of the number of collaborating nodes, and assumes that the network nodes are spread over a distance of 1 km, and each node uses a center frequency of 4 MHz, a transmit power of 40 dBm and an antenna gain of −25 dBi. Similar to FIG. 4, the 99% outage capacity is plotted for a coherence distance ($d_{coh}$) of 250 m and 1 km. As shown in FIG. 6, there is an almost 1000× improvement in capacity when 10 nodes collaborate in the worst correlation conditions.

Additional Exemplary Embodiments of the Presently Disclosed Technology

In some embodiments, all the network nodes are fully connected. The selection of a reference node, which completes Stage 2 with all nodes individually, may be performed in a sequence of its choice, since all nodes are within hearing range of the reference node. The choice of the reference node may pertain to the best average link SNR (averaged over all other nodes). More generally, any function (e.g., average, median, maximum, etc.) of a link-quality metric (e.g., SNR, SINR, etc.) may be used in the determination of the choice of the network node. It is further assumed, in this embodiment, that link-quality information is available to all nodes which share it and update it regularly.

In some embodiments, the reference node may have good access to some but not all the nodes of the network due to some low-quality links. The reference node may identify such impaired-link nodes and request, via proper messages, the help of neighboring nodes (e.g., send a request that they perform bidirectional exchanges with the impaired-link nodes in more favorable link conditions and thus assist in completing the full reference column via the said identities).

In some embodiments, there may be information on the nature of links (e.g., line-of-sight (LoS) or non-LoS (NLoS)), which may be used to determine which links are to be used by each node in its own bidirectional exchanges (e.g., only the LoS links may be used), in the process of filling out the phase matrix.

In some embodiments, an initial node may be chosen either at random, or via a quality metric (e.g., best link SNR among nodes), and is referred to as "node 1". Node 1 completes $\delta\varnothing_{12}$ with a second node ("node 2"), which may be the node within hearing range of node 1 with the highest link SNR of all links out of node 1. The pair (1,2) is announced via a short message, so that all nodes in the network know which pairs have been covered. Then node 2 completes $\delta\varnothing_{23}$ with a subsequent node ("node 3"), chosen in a similar manner as before, and the pair is announced, and so on. The process ends when all nodes within hearing range (e.g., one-hop nodes) have been completed. If there are nodes within hearing range in some portion of the network (e.g., in a network of at least 2 hops), then a node from the second hop requests participation to the self-coherence process. The node(s) which hear it extend the process to that node, which then completes the process for those in the second-hop hearing range, and the process repeats until all hops have been covered. Thus, distributed collaborative beamforming can be applied to multi-hop (and not fully connected) networks, provided that the whole multi-hop network is within range of the probe of destination D for the subsequent stages.

In some embodiments, the estimate of the individual terms $\delta\varnothing_{ij}$ may be accompanied by a quality metric, signifying the confidence of the estimating node on the quality of the said term (e.g., an estimated error variance). The various quality metrics may be distributed in message exchanges and used subsequently to refine estimates either via the use of identities (such as the triangle identity) when completing the matrix $\Delta\varnothing$, namely by incorporating weighting terms in the computation, or in refining final estimates of reciprocal links ((i→j) and (j→i)), assuming that the protocol allows computation of both. The final quality metrics for all relevant phase-difference qualities may be used for selecting the reference node, e.g., as the one whose column possesses the highest average quality metric. Links for which the quality of the estimate $\delta\varnothing_{ij}$ is deemed unacceptable (too noisy) may discard the estimate and another sequence of nodes in the computation process may be selected.

In some embodiments, individual links may be subjected to significant interference (e.g., due to jamming). The elements of the matrix corresponding to such corrupted links may be eliminated from the bidirectional signal exchange (phase measurement) process. Instead, the said elements may be filled in via other measurements in related uncorrupted links and the use of the aforementioned identities (e.g., the triangle identity).

In some embodiments, the network nodes may use separate oscillator phases for the transmit and receive modes.

In some embodiments, the terms $\delta\varnothing_{ij}$ are computed not just by bidirectional signal exchanges between nodes but by a mixture of signal exchanges as well as message exchanges, whereby the messages convey the (quantized) value of the estimated baseband phase of the radio that has received a signal and has computed such a phase. The final estimate of $\delta\varnothing_{ij}$ is computed by proper combination of the signal phases as well as the massage-conveyed phase values.

In some embodiments, the terms $\delta\varnothing_{ij}$ are estimated via parameter-tracking methods which account for mobility and phase-noise impairments. Such phase-tracking methods can also be used to fill in (e.g. by prediction) estimated values in case the process is interrupted for a short period of time. In an example, these tracking methods can also be used to reduce the frequency for bidirectional exchanges, thus lowering the network overhead traffic necessary to support the embodiments described in the present document.

In some embodiments, a variety of methods in may be employed in choosing the strongest channel tap for computing the respective phase. In an example, the strongest channel tap is the direct largest gain value among taps. In another example, a complex channel tap is computed via interpolation methods between taps estimated using the observation samples (measurements) of the channel-estimation process.

In some embodiments, each of the mobile nodes (e.g., 121 and 122 in FIG. 1A) is configured to support a dual-channel radio, which is typically defined as two distinct radios inside a common mechanical enclosure. For an exemplary downlink, one of the first two radios is dedicated to the HF communication link and the second of the two radios operates over either the VHF, UHF, L-band or S-band. For an exemplary uplink, the first and second radios support the HF and VHF communication links, respectively. The methods described in this document may be implemented in dual-channel radios by leveraging existing communication lines (physical wired connections) between the two baseband processors, FPGAs, GPPs, etc., of each of the two radios in order to exchange the collaboration messages. In an example, a dual-channel radio can be configured to use the time multiplexing scheme or frequency multiplexing scheme shown in FIGS. 3A and 3B, respectively.

In some embodiments, each of the mobile nodes (e.g., 121 and 122 in FIG. 1A) is configured to support two physically separated radios connected by a wired (e.g., Ethernet) or wireless (e.g., local Wi-Fi link) connections.

Methods for Collaborative Uplink and Downlink Communication

Figure 7:
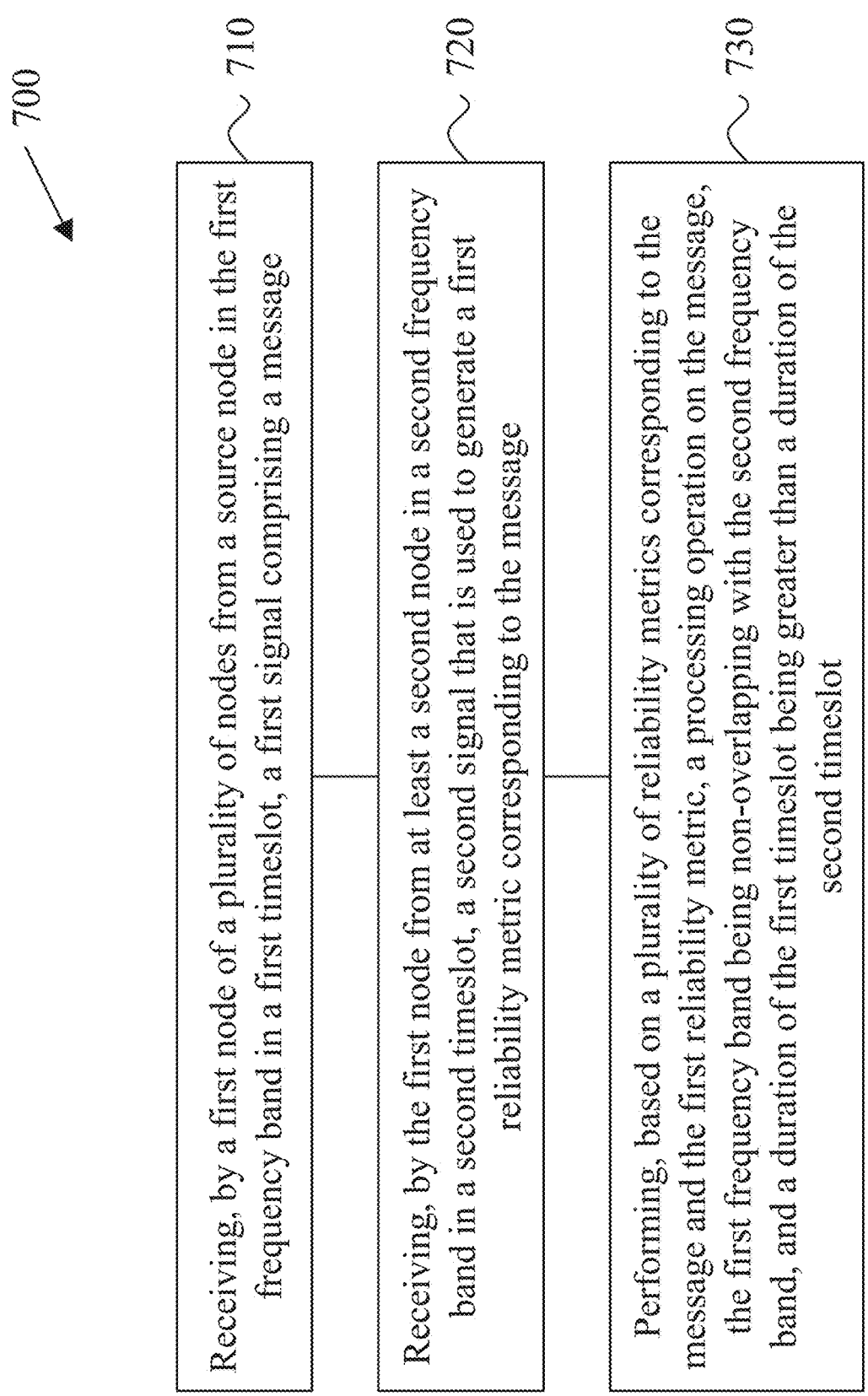
FIG. 7 shows a flowchart of an exemplary method for collaborative communication, in accordance with embodiments of the disclosed technology.

FIG. 7 shows a flowchart of an example of a method 700 enabling connectivity over a disadvantaged link operating in a first frequency band. The method 700 includes, at operation 710, receiving, by a first node of a plurality of nodes from a source node in the first frequency band in a first timeslot, a first signal comprising a message.

The method 700 includes, at operation 720, receiving, by the first node from at least a second node in a second frequency band in a second timeslot, a second signal that is used to generate a first reliability metric corresponding to the message.

The method 700 includes, at operation 730, performing, based on a plurality of reliability metrics corresponding to the message and the first reliability metric, a processing operation on the message, the first frequency band being non-overlapping with the second frequency band, and a duration of the first timeslot being greater than a duration of the second timeslot.

In some embodiments, the method 700 further includes the operation of generating, based on performing the processing operation on the message, the plurality of reliability metrics.

In some embodiments, the method 700 further includes the operation of transmitting, by the first node in the second frequency band, a third signal comprising a second reliability metric of the plurality of reliability metrics.

In some embodiments, the first reliability metric is based on combining multiple partial reliability metrics.

In some embodiments, the first frequency band is a high-frequency (HF) band, and wherein a center frequency of the second frequency band is greater than a center frequency of the first frequency band.

In some embodiments, the second frequency band is a ultra-high-frequency (UHF) band, a very-high-frequency (VHF) band, an S-band or an L-band.

In some embodiments, the processing operation comprises at least one of an equalization operation, a data detection operation or an FEC decoding operation.

In some embodiments, the processing operation further comprises at least one of generating a channel response for the disadvantaged link, estimating a frequency offset of the disadvantaged link or updating one or more equalizer taps in the equalization operation.

Figure 8:
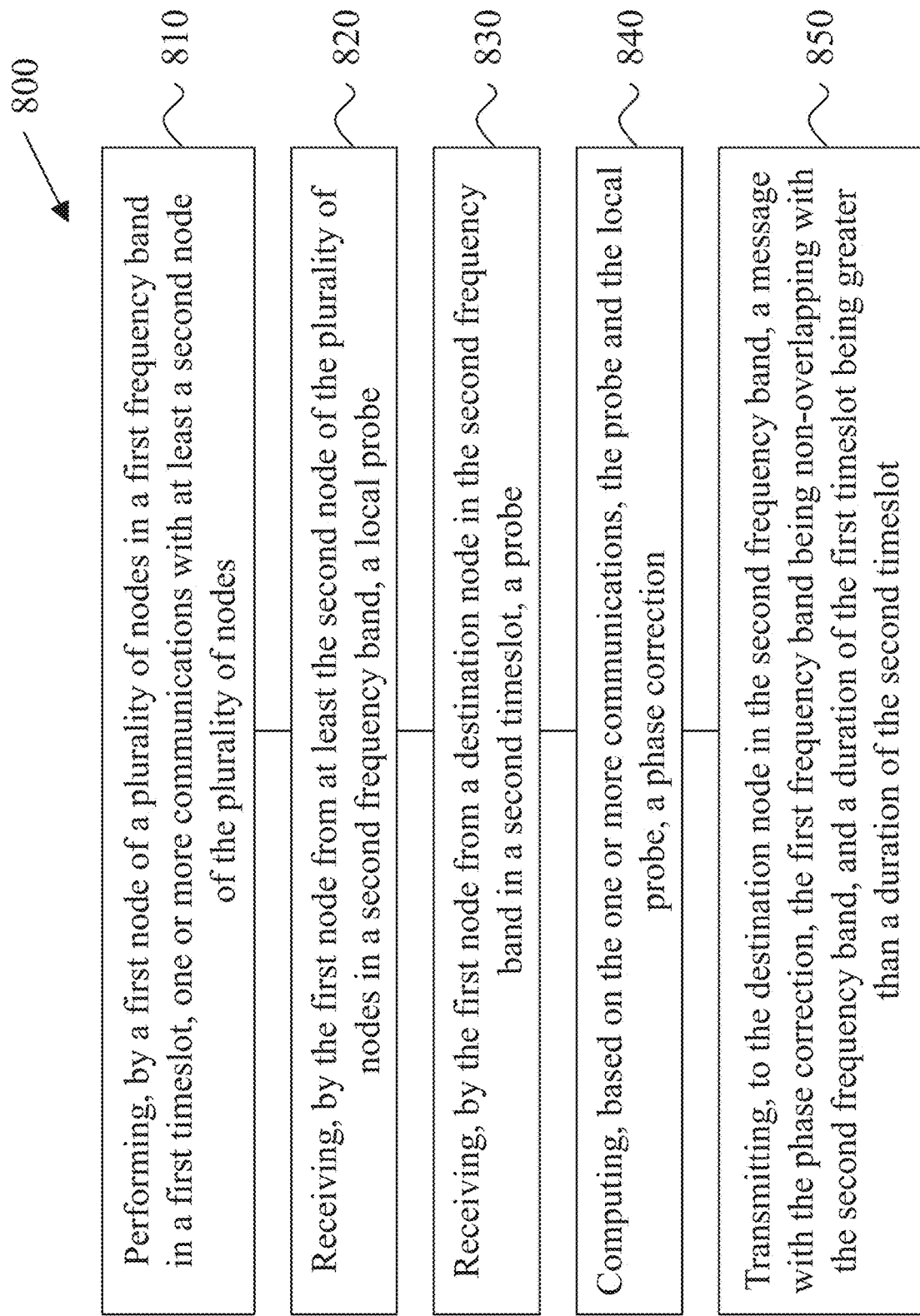
FIG. 8 shows a flowchart of another exemplary method for collaborative communication, in accordance with embodiments of the disclosed technology.

FIG. 8 shows a flowchart of an example of a method 800 enabling connectivity over a disadvantaged link operating in a first frequency band. The method 800 includes, at operation 810, performing, by a first node of a plurality of nodes in a first frequency band in a first timeslot, one or more communications with at least a second node of the plurality of nodes.

The method 800 includes, at operation 820, receiving, by the first node from at least the second node of the plurality of nodes in a second frequency band, a local probe.

The method 800 includes, at operation 830, receiving, by the first node from a destination node in the second frequency band in a second timeslot, a probe.

The method 800 includes, at operation 840, computing, based on the one or more communications, the probe and the local probe, a phase correction.

The method 800 includes, at operation 850, transmitting, to the destination node in the second frequency band, a message with the phase correction, the first frequency band being non-overlapping with the second frequency band, and a duration of the first timeslot being greater than a duration of the second timeslot.

In some embodiments, the method 800 further includes the operation of receiving information corresponding to the message from (a) a third node of the plurality of nodes, (b) a backbone-type network or (c) a source node that is different from each of the plurality of nodes.

In some embodiments, the one or more communications comprises a bi-directional communication that is performed with each of the plurality of nodes.

In some embodiments, the first frequency band is a very-high-frequency (VHF) band, and wherein the second frequency band is a high-frequency (HF) band.

In some embodiments, communication in the first frequency band uses a first transceiver, communication in the second frequency band uses a second transceiver, and a local oscillator of the first transceiver is coupled to a local oscillator of the second transceiver. In an example, the coupling of the two oscillators may use a master-slave configuration, which ensures that the oscillators are kept synchronized in order to implement the correct phase to achieve collaborative uplink communication.

Figure 9:
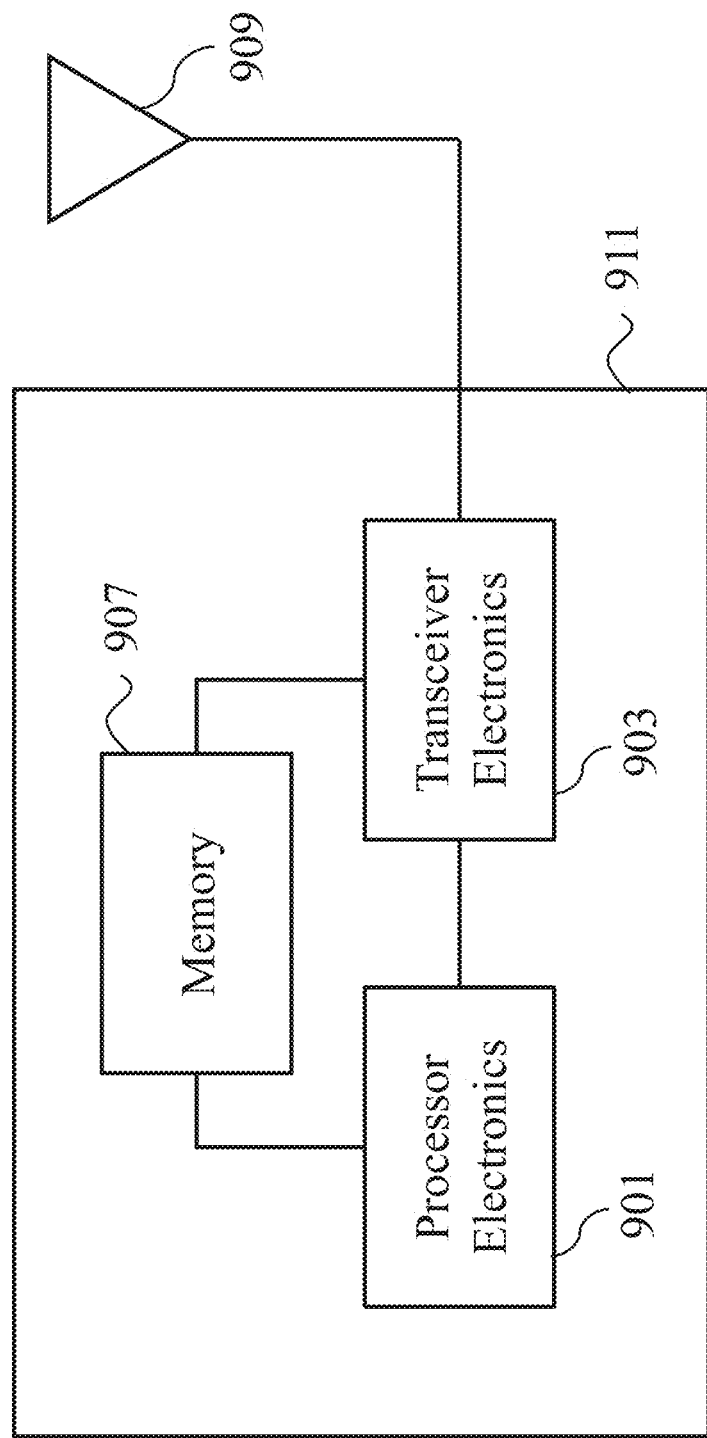
FIG. 9 is a block diagram representation of a portion of a radio that may be used to implement embodiments of the disclosed technology.

FIG. 9 is a block diagram representation of a portion of a radio, in accordance with some embodiments of the presently disclosed technology. A radio 911 can include processor electronics 901 such as a microprocessor that implements one or more of the techniques presented in this document. The radio 911 can include transceiver electronics 903 to send and/or receive wireless signals over one or more communication interfaces such as antenna(s) 909. The radio 911 can include other communication interfaces for transmitting and receiving data. Radio 911 can include one or more memories 907 configured to store information such as data and/or instructions. In some implementations, the processor electronics 901 can include at least a portion of the transceiver electronics 903. In some embodiments, at least some of the disclosed techniques, modules or functions (including, but not limited to, methods 700 and 800) are implemented using the radio 911.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for enabling connectivity over a disadvantaged link operating in a first frequency band, comprising:
   receiving, by a first node of a plurality of nodes from a source node in the first frequency band in a first timeslot, a first signal comprising a message;
   receiving, by the first node from at least a second node in a second frequency band in a second timeslot, a second signal that is used to generate a first reliability metric corresponding to the message; and
   performing, based on a plurality of reliability metrics corresponding to the message and the first reliability metric, a first processing operation on the message, wherein the first frequency band is non-overlapping with the second frequency band, and wherein a duration of the first timeslot is greater than a duration of the second timeslot.

2. The method of claim 1, further comprising:
   generating, based on performing a second processing operation on the message, the plurality of reliability metrics.

3. The method of claim 2, further comprising:
   transmitting, by the first node in the second frequency band, a third signal comprising a second reliability metric of the plurality of reliability metrics.

4. The method of claim 1, wherein the first reliability metric is based on combining multiple partial reliability metrics.

5. The method of claim 1, wherein the first frequency band is a high-frequency (HF) band, and wherein a center frequency of the second frequency band is greater than a center frequency of the first frequency band.

6. The method of claim 5, wherein the second frequency band is a ultra-high-frequency (UHF) band, a very-high-frequency (VHF) band, an S-band, or an L-band.

7. The method of claim 1, wherein the first processing operation comprises at least one of an equalization operation, a data detection operation, or a forward error correction (FEC) decoding operation.

8. The method of claim 7, wherein the first processing operation further comprises at least one of generating a channel response for the disadvantaged link, estimating a frequency offset of the disadvantaged link, or updating one or more equalizer taps in the equalization operation.

9. A method for enabling connectivity over a disadvantaged link operating in a first frequency band, comprising:
   performing, by a first node of a plurality of nodes in a first frequency band in a first timeslot, one or more communications with at least a second node of the plurality of nodes;
   receiving, by the first node from at least the second node of the plurality of nodes in a second frequency band, a local probe;
   receiving, by the first node from a destination node in the second frequency band in a second timeslot, a probe;
   computing, based on the one or more communications, the probe and the local probe, a phase correction; and
   transmitting, to the destination node in the second frequency band, a message with the phase correction,
   wherein the first frequency band is non-overlapping with the second frequency band, and wherein a duration of the first timeslot is greater than a duration of the second timeslot.

10. The method of claim 9, further comprising:
    receiving information corresponding to the message from (a) a third node of the plurality of nodes, (b) a backbone-type network, or (c) a source node that is different from each of the plurality of nodes.

11. The method of claim 9, wherein the one or more communications comprises a bi-directional communication that is performed with each of the plurality of nodes.

12. The method of claim 9, wherein the first frequency band is a very-high-frequency (VHF) band, and wherein the second frequency band is a high-frequency (HF) band.

13. The method of claim 12, wherein communication in the first frequency band uses a first transceiver, wherein communication in the second frequency band uses a second transceiver, and wherein a local oscillator of the first transceiver is coupled to a local oscillator of the second transceiver.

14. An apparatus for enabling connectivity over a disadvantaged link operating in a first frequency band, comprising:
    a processor; and
    a memory with instructions thereon, wherein the instructions upon execution by the processor cause the processor to:
      receive, by a first node of a plurality of nodes from a source node in the first frequency band in a first timeslot, a first signal comprising a message,
      receive, by the first node from at least a second node in a second frequency band in a second timeslot, a second signal that is used to generate a first reliability metric corresponding to the message, and
      perform, based on a plurality of reliability metrics corresponding to the message and the first reliability metric, a first processing operation on the message, wherein the first frequency band is non-overlapping with the second frequency band, and wherein a duration of the first timeslot is greater than a duration of the second timeslot.

15. The apparatus of claim 14, wherein the instructions upon execution by the processor further cause the processor to:

generate, based on performing a second processing operation on the message, the plurality of reliability metrics.

16. The apparatus of claim 15, wherein the instructions upon execution by the processor further cause the processor to:

transmitting, by the first node in the second frequency band, a third signal comprising a second reliability metric of the plurality of reliability metrics.

17. The apparatus of claim 14, wherein the first reliability metric is based on combining multiple partial reliability metrics.

18. The apparatus of claim 14, wherein the first frequency band is a high-frequency (HF) band, and wherein a center frequency of the second frequency band is a greater than a center frequency of the first frequency band.

19. The apparatus of claim 18, wherein the second frequency band is a ultra-high-frequency (UHF) band, a very-high-frequency (VHF) band, an S-band, or an L-band.

20. The apparatus of claim 14, wherein the first processing operation comprises at least one of an equalization operation, a data detection operation, a forward error correction (FEC) decoding operation, generating a channel response for the disadvantaged link, estimating a frequency offset of the disadvantaged link, or updating one or more equalizer taps in the equalization operation.

* * * * *